(12) United States Patent
Drori et al.

(10) Patent No.: US 9,608,687 B2
(45) Date of Patent: Mar. 28, 2017

(54) COMPUTER BASED ACTIVITY CENTER

(71) Applicant: SENSEAPP INTERNATIONAL LTD., Moshav Bitzaron (IL)

(72) Inventors: Rami Drori, Givat Ella (IL); Aliza Almagor, Moshav Bitzaron (IL)

(73) Assignee: SENSEAPP INTERNATIONAL Ltd., Moshav Bitzaron (IL)

( * ) Notice: Subject to any disclaimer, the term of this patent is extended or adjusted under 35 U.S.C. 154(b) by 0 days.

(21) Appl. No.: 15/135,582

(22) Filed: Apr. 22, 2016

(65) Prior Publication Data

US 2016/0233914 A1    Aug. 11, 2016

Related U.S. Application Data

(63) Continuation of application No. 14/389,859, filed as application No. PCT/IL2013/050093 on Jan. 31, 2013, now Pat. No. 9,350,838.

(Continued)

(51) Int. Cl.

| | |
|---|---|
| *H04M 1/02* | (2006.01) |
| *H04B 1/3888* | (2015.01) |
| *A63F 13/54* | (2014.01) |
| *A63F 13/98* | (2014.01) |
| *A63F 13/2145* | (2014.01) |
| *H04M 1/677* | (2006.01) |
| *H04M 1/18* | (2006.01) |
| *A63F 9/24* | (2006.01) |
| *H04M 1/04* | (2006.01) |

(Continued)

(52) U.S. Cl.
CPC ............ *H04B 1/3888* (2013.01); *A63F 9/24* (2013.01); *A63F 13/02* (2013.01); *A63F 13/2145* (2014.09); *A63F 13/54* (2014.09); *A63F 13/98* (2014.09); *G06F 1/1632* (2013.01); *H04M 1/0202* (2013.01); *H04M 1/0283* (2013.01); *H04M 1/04* (2013.01); *H04M 1/185* (2013.01); *H04M 1/677* (2013.01); *A63F 2003/0094* (2013.01); *A63F 2009/241* (2013.01); *A63F 2009/2408* (2013.01); *A63F 2009/2458* (2013.01); *A63F 2300/1043* (2013.01); *G06F 2200/1633* (2013.01); *H04M 2250/22* (2013.01)

(58) Field of Classification Search
CPC .... H04M 1/0214; H04M 1/23; H04M 1/0247; H04M 1/0237; H04B 1/3833
USPC ............ 455/550.1, 575.1, 575.8, 566, 158.4
See application file for complete search history.

(56) References Cited

U.S. PATENT DOCUMENTS

| | | | |
|---|---|---|---|
| 2002/0042291 A1 | 4/2002 | Lahteenmaki | |
| 2004/0113417 A1* | 6/2004 | Chareas | B42D 5/042 |
| | | | 281/44 |

(Continued)

FOREIGN PATENT DOCUMENTS

| | | |
|---|---|---|
| EP | 2363790 A1 | 9/2011 |
| WO | 2004093517 A2 | 11/2004 |
| WO | 2013150514 A1 | 10/2013 |

*Primary Examiner* — Cong Tran
(74) *Attorney, Agent, or Firm* — Roach Brown McCarthy Gruber, P.C.; Kevin D. McCarthy

(57) ABSTRACT

The present invention relates to a casing for accommodating a computer based device or an activity board having an input/output port interface and/or an interface in form of a touch sensitive screen, comprising one or more operating means (e.g., levers, handles, buttons, knobs) and/or one or more apertures for interacting with said device, wherein said casing, at least partially, can cover the interface of said device.

7 Claims, 15 Drawing Sheets

Related U.S. Application Data

(60) Provisional application No. 61/619,587, filed on Apr. 3, 2012, provisional application No. 61/664,200, filed on Jun. 26, 2012.

(51) Int. Cl.
*G06F 1/16* (2006.01)
*A63F 3/00* (2006.01)

(56) References Cited

U.S. PATENT DOCUMENTS

| | | |
|---|---|---|
| 2006/0169607 A1 | 8/2006 | Carnevali |
| 2006/0256090 A1 | 11/2006 | Huppi |
| 2008/0223937 A1 | 9/2008 | Preta et al. |
| 2009/0079705 A1 | 3/2009 | Sizelove |
| 2009/0213086 A1 | 8/2009 | Chae et al. |
| 2010/0081505 A1 | 4/2010 | Alten |
| 2010/0302168 A1 | 12/2010 | Giancarlo |
| 2010/0318366 A1* | 12/2010 | Sullivan ............ H04M 1/72519 704/275 |
| 2011/0034221 A1 | 2/2011 | Hung et al. |
| 2011/0203954 A1* | 8/2011 | Kroupa .............. B65H 75/4431 206/320 |
| 2011/0252609 A1 | 10/2011 | Rothbaum et al. |
| 2012/0020586 A1 | 1/2012 | Gilbert |
| 2012/0037536 A1 | 2/2012 | Lonsdale, II et al. |
| 2012/0188743 A1 | 7/2012 | Wilson et al. |
| 2013/0201092 A1* | 8/2013 | Prakash ................ G06F 3/0483 345/156 |
| 2013/0296004 A1 | 11/2013 | Tages et al. |
| 2014/0011164 A1 | 1/2014 | Tsui |

\* cited by examiner

COMPUTER BASED ACTIVITY CENTER

FIELD OF THE INVENTION

The present invention relates to the field of activity and training platforms. More particularly, the invention relates to an activity platform in form of a frame-like apparatus adapted for receiving, accommodating or covering a device, such as a portable computer based device having means for inputting data through an input/output port or a touch panel or a touch sensitive screen, such as a tablet or a smart phone.

BACKGROUND OF THE INVENTION

An iPad (of Apple Inc.) is one example of a portable device having a touch sensitive screen and an input/output port. Other examples include tablets, cellular telephones (e.g., iPhone), Personal Computer (PC), video games, satellite navigation devices, etc.

Such devices have usually a button (e.g. Home button in iPad) used for terminating running applications (e.g., a game application dedicated for children) and returning to the home display. This button can unintentionally be pressed especially by toddlers that consequently can be exposed to undesirable applications. It is therefore could be helpful to provide means to prevent unintentionally termination of a running application.

It is an object of the present invention to turn a portable computer based devices into an activity platform for toddlers.

It is another object of the present invention to provide an activity platform which is capable of covering and protecting the device to which it is attached.

It is still an object of the present invention to provide means which are capable of blocking an unintentionally access to one or more functional buttons of a touch screen based device.

Other objects and advantages of the invention will become apparent as the description proceeds.

SUMMARY OF THE INVENTION

The present invention relates to a casing for accommodating a computer based device or an activity board having an input/output port interface and/or an interface in form of a touch sensitive screen, comprising one or more operating means (e.g., levers, handles, buttons, knobs) and/or one or more apertures for interacting with said device, wherein said casing, at least partially, can cover the interface of said device.

According to an embodiment of the invention, the interaction is performed via any suitable communication protocols, either wired (e.g., via a USB port) or wireless (e.g., via Bluetooth, WiFi).

According to an embodiment of the invention, the casing comprises an electronic unit which includes: a) a processing unit; b) a memory module; and c) a communication module. The casing may also include one or more audible elements for generating sounds and/or one or more visual indicators (e.g., LEDs).

According to an embodiment of the invention, the casing has connection means to the input/output port of the computer based device or to the activity board.

According to an embodiment of the invention, the casing is adapted for blocking access, fully or partially, to one or more functional buttons of the computer based device or the activity board.

According to an embodiment of the invention the one or more apertures are used to connect at least one add-on accessory to said casing.

In another aspect the casing further comprises connecting means for attaching add-on accessories (e.g., external or additional accessories such as boards, keypads, keyboards, cameras, webcams, etc.). The connecting means connect each add-on accessory to said casing either electronically, mechanically or by a combination thereof. For example, the add-on accessory can be a board for various activities (e.g. game board) adapted to cover, at least partially, the interface of the device. The board is provided with one or more predefined apertures for providing limited or predefined access to the interface of the device.

According to an embodiment of the invention the casing further comprises a transparent shield for protecting the interface of the device.

In another aspect the casing further comprise different patterns, textures, and colors, so as to provide visual and tactile stimulation for a user.

According to an embodiment of the invention the casing further comprises anchoring means attached to the rear surface and/or side(s) of said casing for fixing it in a desired location or position. The anchoring means are one or more suction cups attached to the rear surface of said casing, for fixing it to a flat surface, such as floor, a table top, etc. For example, the anchoring means can be one or more Velcro straps attached to the rear surface and/or side panel(s) of said casing, for fastening said device to a car's seat.

According to an embodiment of the invention the casing further comprises a cover for protecting the interface of the device (e.g., when the device is not in use).

According to an embodiment of the invention the casing further comprises a biometric module for identifying the user of the device.

DETAILED DESCRIPTION OF THE INVENTION

Throughout this description the term "casing" is used to indicate an essentially frame-like housing adapted to accommodate devices, such as a computer-based devices with a touch screen (e.g., an iPad), an activity board, such as a game board, etc. This term does not imply any particular shape, construction material or geometry, and the invention is applicable to all suitable frame-like housing.

Reference will now be made to several embodiments of the present invention(s), examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Similarly, while certain examples may refer to a touch screen based tablet or mobile device, other electronic devices, not necessarily computer based one, such as a simple game board can be used as well, such as, without limitation, an interactive television, a personal digital assistant (PDA), an all-in-one PC, a game console, a networked entertainment device, a smart phone (e.g., with an operating system and on which a user can install applications), a system having a desk type touch sensitive interface and so on.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

Figure 1:
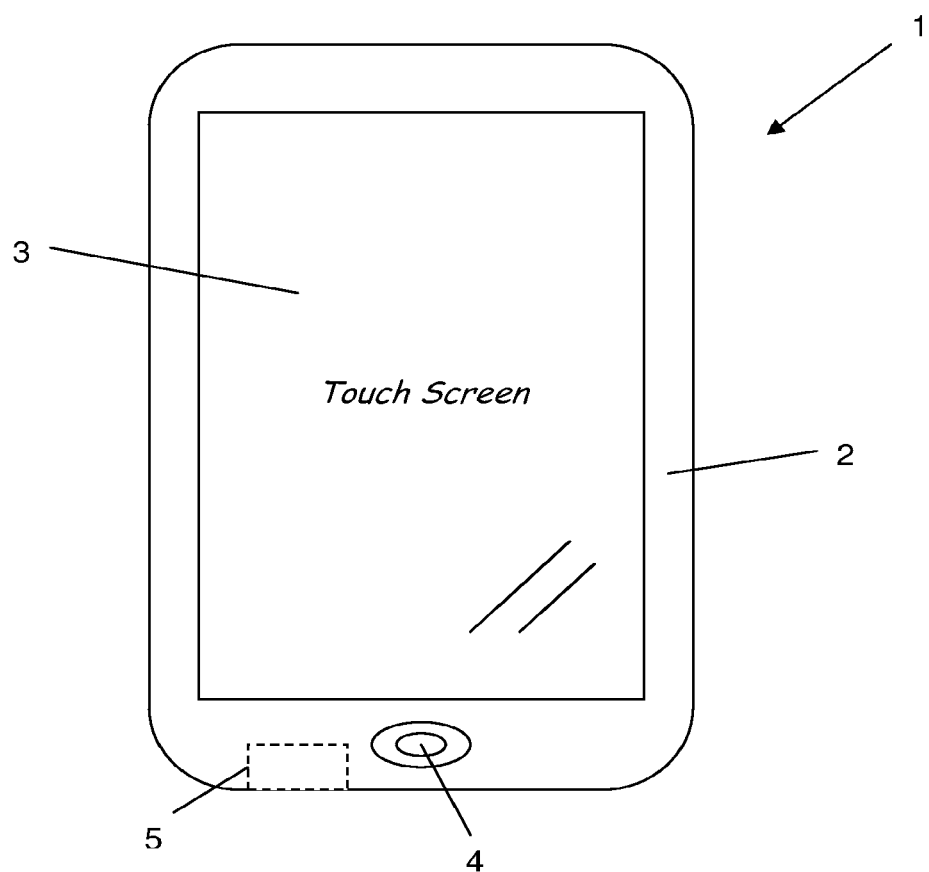
FIG. 1 schematically illustrates a portable computer device provided with a touch sensitive screen.

FIG. 1 schematically illustrates, as an example and without limitation, a portable computer device 1 commonly referred to as a "tablet" and embodying touch screen technology as well as traditional switch keys. For example, the portable computer device 1 includes a generally rectangular housing 2 with a touch-sensitive display screen 3. The housing 2 may include one or more functional buttons (such as button 4) which are connected to an electronic circuit (not shown). Different front, rear and side surfaces of the housing 2 may include one or more control and interface means, for example a volume keys, as well as a battery charger jack, and/or an audio head-phone output jack (not shown). Portable data devices 1 are also known to include an interface jacks, such as a serial or parallel input/output (I/O) port or more modern USB I/O port (as schematically illustrated by the dotted line and as indicated by numeral 5).

Figure 2:
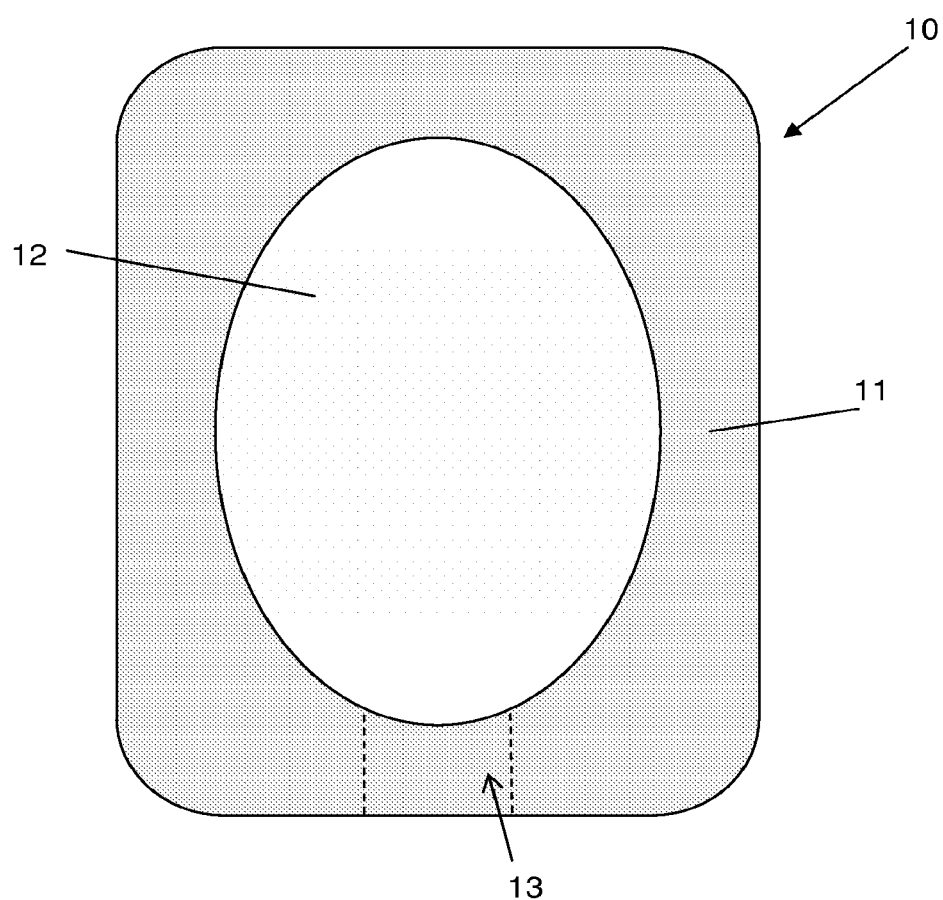
FIG. 2 schematically illustrates a multi-purpose casing for accommodating the portable computer device of FIG. 1, according to an embodiment of the present invention.

FIG. 2 shows a multi-propose casing which may also serve as an activity platform, to be discussed in greater details herein below. The casing illustrated in this figure is particularly convenient because it can be applied as a casing device to existing portable data devices without the need to carry out any alterations in their structure. The casing can also adapted to be used with non-portable devices such as interactive television, a personal digital assistant (PDA), an all-in-one PC, a game console, a networked entertainment device, a system having a desk type touch sensitive interface and so on.

The casing device generally indicated by numeral 10 in the figure includes a frame-like structure 11 for covering and/or protecting, at least partially, the body of the portable computer device 1 of FIG. 1. Optionally, casing 10 may also include a transparent shield 12 for protecting the exposed surface of the touch-sensitive display screen 3 of device 1, which is not covered by the frame-like structure 11. The casing 10 may also include connection means to the input/output jack in the computer based device.

According to an embodiment of the present invention, the casing device 10 is configured in such a way that it blocks access to one or more functional buttons of the portable computer device 1 of FIG. 1. In this example, the device 10 will block access to the functional button 4 of device 1 by covering it with the frame-like structure 11 (e.g., see the area indicated by numeral 13 between the dotted lines in FIG. 2). In this manner, the device 1 can be used by toddlers (e.g., while interacting with an application such as a specific game or any other application suitable for them), while preventing the toddler from unintentionally exiting or terminating the application and consequently prevents the child from reaching sensitive data stored on the device 1 or accessing applications that are restricted for him.

According to some embodiments, the casing device 10 is constructed in such a way that the cover of one or more of the functional buttons can be built to block access by a toddler, but it will allow operation of that button by an adult. For example, this can be done by providing a flip mechanism that utilizes a Velcro or other type of fastener (not shown) or a semi-blocking patch through which the button can be pressed by applying sufficient force in the extent that cannot be applied by toddlers.

The casing device 10 may cover at least part of the touch sensitive screen, or all of it, while remaining one or more limited apertures that allow direct access to the surface of the screen. Such configuration can be obtained by providing the casing device 10 as a plain casing unit or as a casing unit with plurality of accessories as described with further details hereinafter with respect to FIGS. 5A-5C, 6A-6C and FIG. 8.

Figure 3:
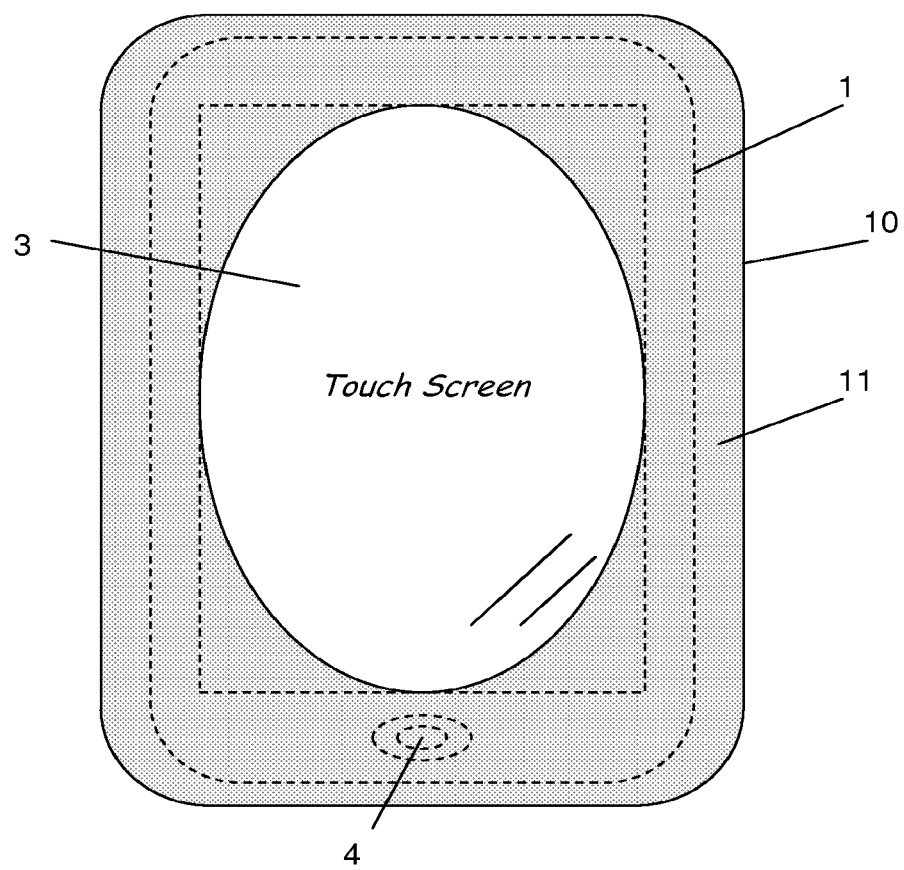
FIG. 3 schematically illustrates the portable computer device of FIG. 1 covered with the multi-purpose casing of FIG. 2.

FIG. 3 schematically illustrates the portable device 1 covered with the casing device 10 of FIG. 2. The dotted lines represent the portable computer device 1 as placed within the casing device 10. As it can be seen there is no direct access to the functional button 4.

Figure 4:
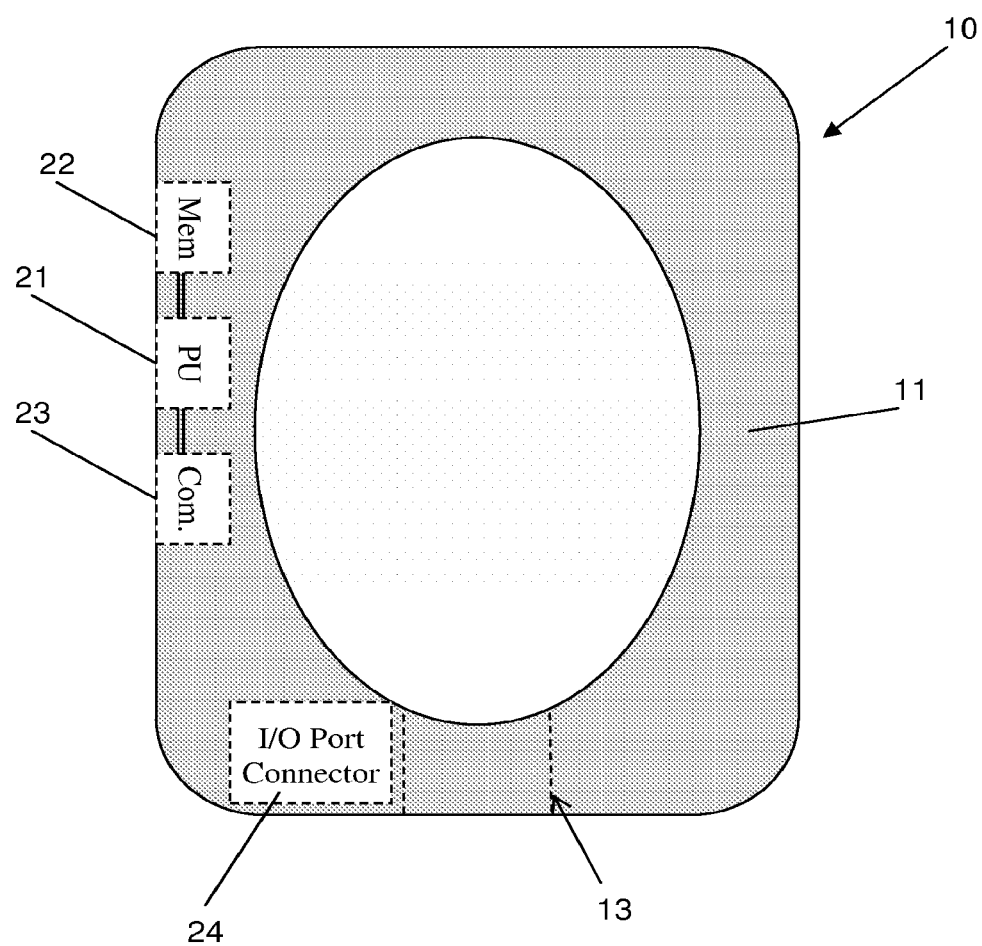
FIG. 4 schematically illustrates an activity center provided with processing means, according to an embodiment of the present invention.

Referring now to FIG. 4, the casing device 10 is shown in accordance with another embodiment of the present invention. The casing 10 comprises electronic components 21-23 such as a Processing Unit (PU) 21 (e.g., a microprocessor), a memory module 22 (e.g., a RAM) and a communication module 23. In this embodiment, the casing device 10 is provided with processing capabilities in order to perform variety of functions, such as communicating with the portable computer device 1 and/or with an external data device such as a PC or a smart-phone (either via wireless or wired links). For example, the communication module 23 may include one or more communication techniques such as Bluetooth, WiFi, USB, and the like to communicate with the device 1 either in wireless or wired manner.

According to some embodiments of the invention, the casing device 10 of FIG. 4 comprise a physical I/O connection port 24 for directly communicate with the I/O port 5 of the computer based device 1 (the I/O port 5 is shown in FIG. 1).

For example, the electronic components 21-23 casing 10 can be used for establishing communication between accessories that are embedded in the casing and/or between external accessories connected to the casing 10 directly or through one of the I/O means and device 1.

Figure 6A:
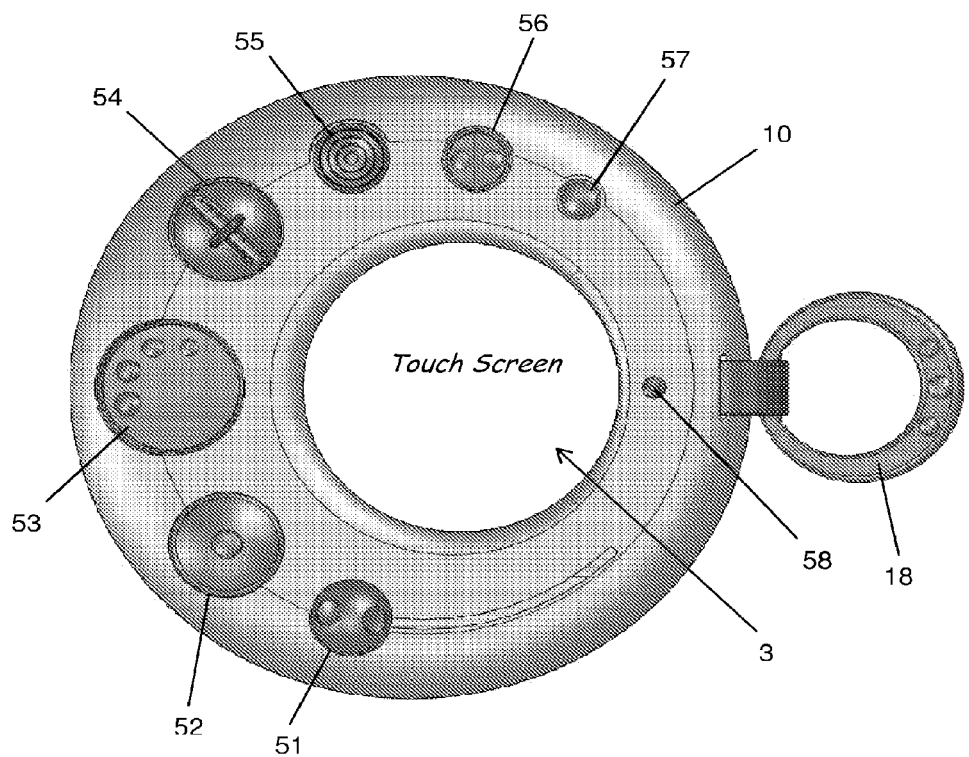
FIGS. 6A to 6C schematically illustrate examples of a multi-purpose casing provided with various implementations of accessories for interacting with an application running on the portable computer device of FIG. 1, according to an embodiment of the present invention.

As another example, the casing 10 can be programmed to generate sounds and/or visual indications (e.g., by one or more LEDs as indicated by numeral 58 in FIG. 6A). According to an embodiment of this invention, the sounds and/or the visual indication are related to the currently running application in device 1.

According to an embodiment of the present invention, the casing device 10 further comprises a biometric sensor or module, such as a fingerprint scanner, eye detector and the like (not shown). The biometric module is used for identifying the current user in order to allow and/or to limit the access to the device 1. This of course depend on the user whether he is the owner of the device 1, a child or other limited user.

Unless otherwise indicated, the functions described herein with respect to the casing 10 may be performed by executable code and instructions stored in computer readable medium (e.g., memory 22) and running on one or more processor-based systems (e.g., PU 21). However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Figure 5A:
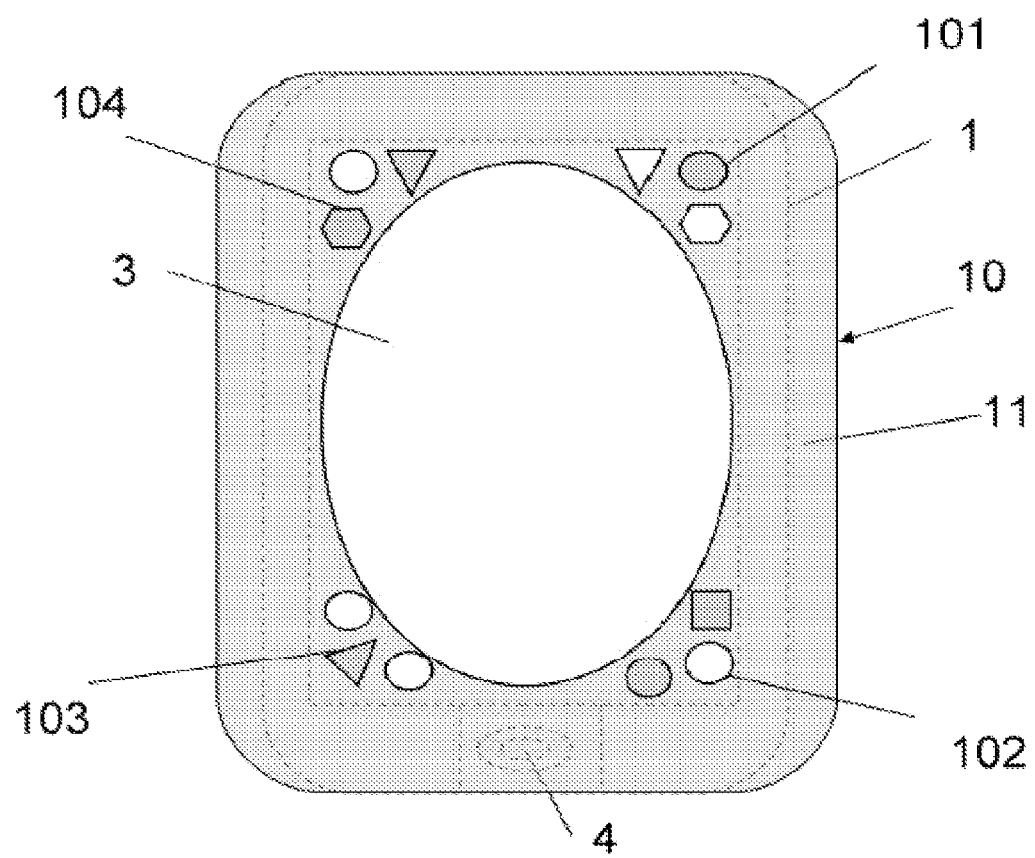
FIG. 5A-5C schematically illustrate examples of a multi-purpose casing provided with various operating means and apertures, according to some embodiments of the invention.
Figure 5B:
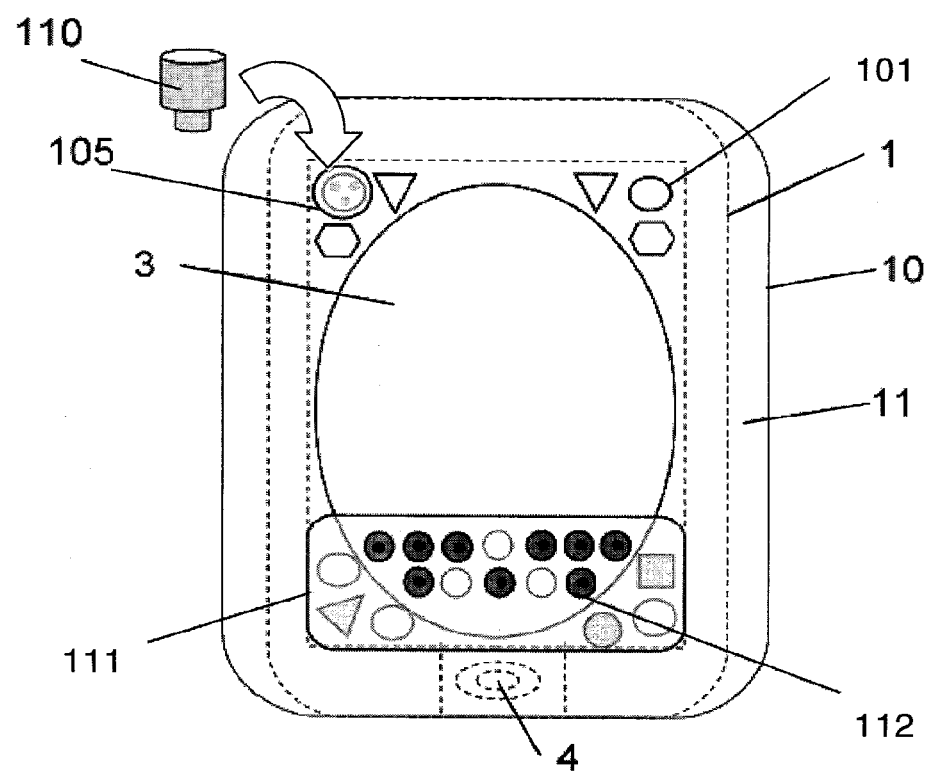
Figure 5C:
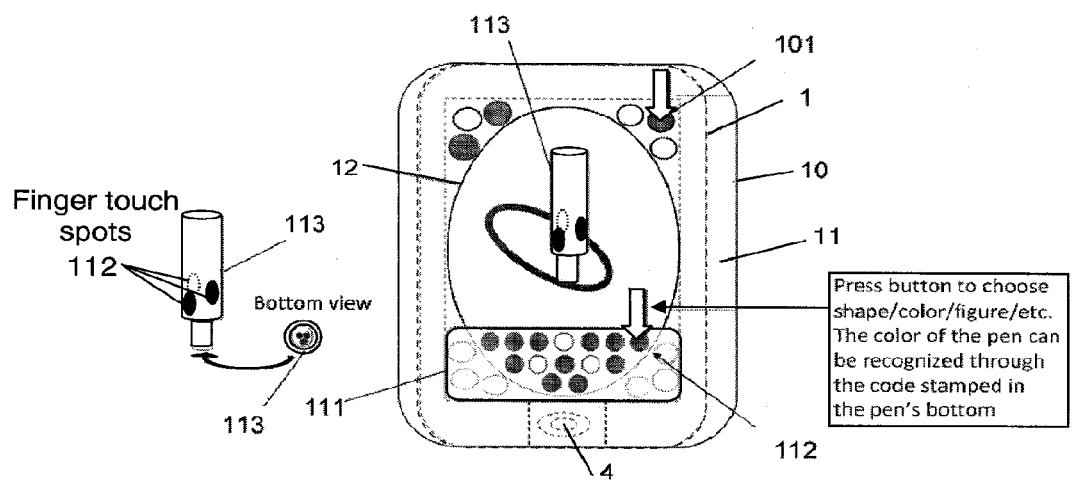

Referring now to FIGS. 5A-5C, according to an embodiment of the present invention, the casing device 10 further comprises one or more apertures (e.g., holes) and/or press buttons, as indicated by numerals 101-104 or 105.

In this embodiment, the casing device 10 is configured in such a way that, at least partially, it covers the outer surface of the touch sensitive screen 3 of the portable device 1, and wherein at least one or more of the apertures and/or buttons 101-104 and 105 are located above the covered area(s) of the touch sensitive screen 3.

FIG. 5A schematically illustrates the portable device 1 covered with the casing device 10 that comprises one or more apertures (e.g., holes) and/or press buttons 101-104. The dotted lines represent the portable computer device 1 as placed within the device 10. As it can be seen, in this embodiment, there is no direct access to the functional button 4.

The apertures and/or buttons 101-104 can be used for different functionalities, for obtaining pinpoint or guided interaction with the touch screen (e.g., in conjunction with a specific application) where the function is recognized through their locations on the touch screen or through protrusions put beneath each button in the manners explained above.

As illustrated in FIG. 5B, the apertures can be used for:
1. Inserting objects that can be recognized by an application through codes that are realized by a set of protrusions either in a fixed order for any object or in a certain order that presents a certain character of the object. For example, inserting an object 110 into a corresponding aperture 105;
2. Attaching one or more external or additional accessories, such as dedicated boards (e.g., different types of keyboards, such as the one indicated by numeral 111 which includes additional apertures and buttons 112) in a precise manner so that an application can recognize the function of a button according to its location on the touch screen. Another way to recognize a function of a button is through protrusions put beneath each button. For example, the dedicated boards may serve different applications, such as typical keyboard in any available language, including Braille or other form of communicators or translators.

The configuration of the casing device 10 with the apertures and buttons (101-105 and 112) as described hereinabove allows connecting an external keyboard (or other type of keypads with different functions such as colors based keypad) to a tablet or to other type of portable computer based device, while eliminating the need to establish a communication protocol link, such as via a wireless connection (e.g., Bluetooth or WiFi). This is a great advantage of the present invention over the common use of communication techniques to pair between an external keyboard and a tablet. The interaction between such external keyboards (e.g., board 111) and the application running on the computer based established via specific area on the touch screen (e.g., specific coordinates) as defined according to the physical location of the apertures and/or buttons on top of the touch sensitive screen 3 of the portable device 1.

An example of an educative application for teaching colors, or for training a toddler to correctly hold a pencil (or other writing tool) or for training a toddler to follow a given drawn pattern appears on the screen is shown with respect to FIG. 5C. In this example, a dedicated board 111 provided with plurality of color printed keys 112, is physically attached and communicated with the touch sensitive screen 3 through the corresponding apertures of casing device 10. Alternatively, pencils like objects each of which represent a different color (numeral 113 indicates one pencil-like object) are provided. Each such object 113 is capable of interacting with the touch sensitive screen 3, for example, using dedicated contacts and conductive mechanism that become active only when the user touch a corresponding conductive element located on a specific location on the body of the object (e.g., a capacitive technique, as indicated by numeral 114). The conductive element can be positioned in such a way, that in order to be able to interact with the touch screen, the user will have to hold the object 113 in a specific manner, and thereby to learn how to hold a writing tool correctly.

Figure 6B:
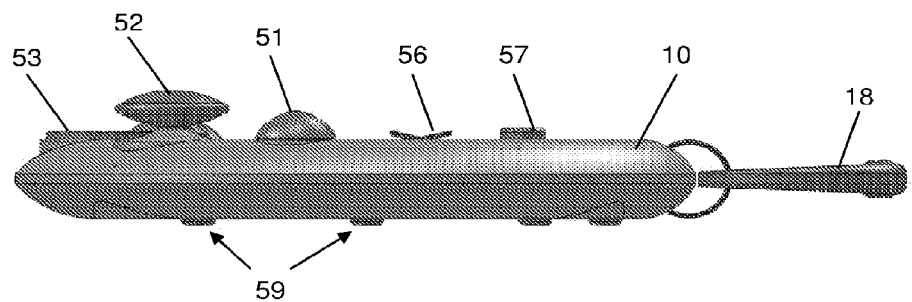
Figure 6C:
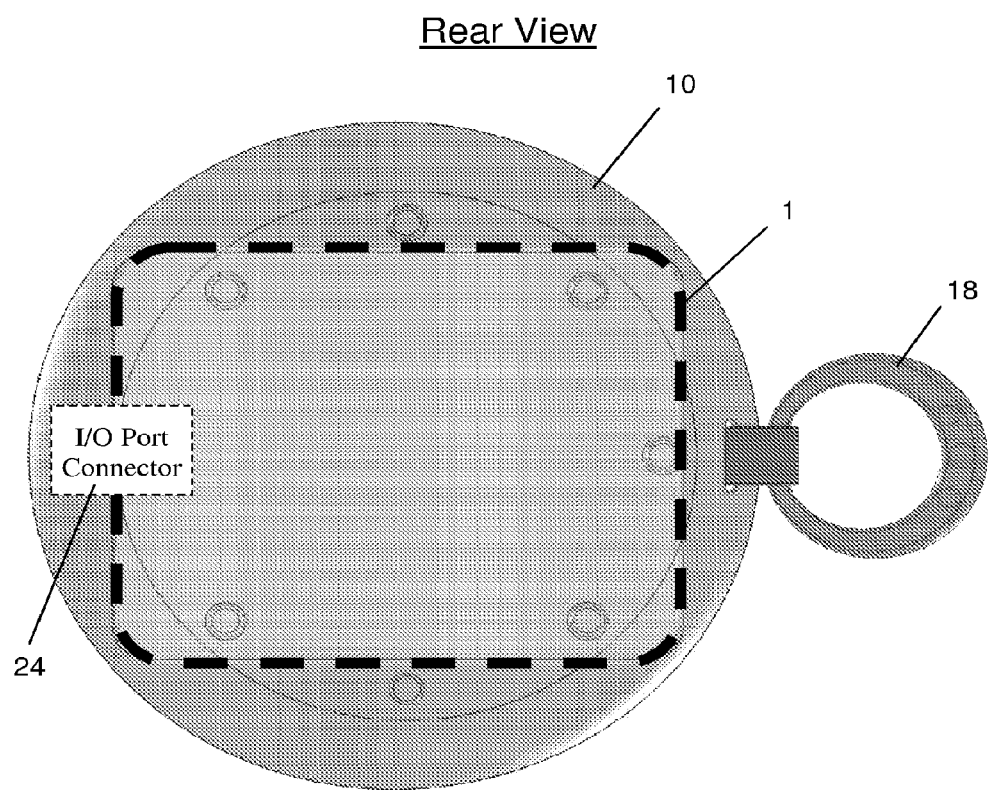
Figure 7:
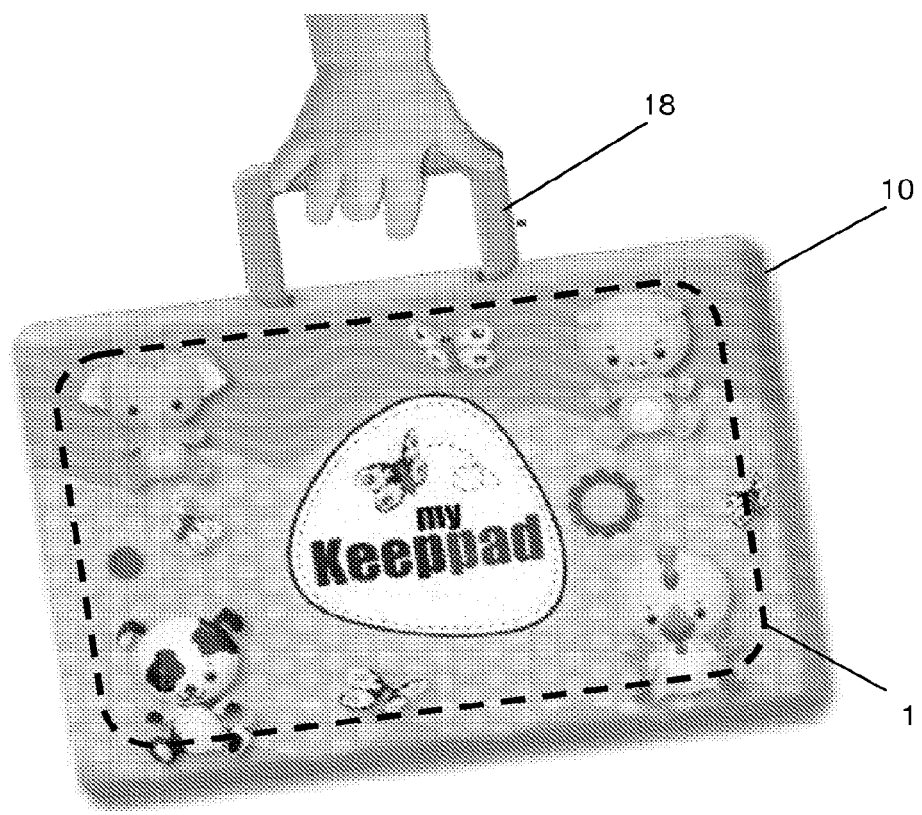
FIG. 7 schematically illustrates a rear view of the multi-purpose casing, according to an embodiment of the present invention.

Referring now to FIGS. 6A-6C, according to an embodiment of the present invention, the casing device 10 comprises one or more accessories, as indicated by numerals 51-58. In this embodiment, the casing device 10 is configured in such a way that, at least partially, it covers the outer surface of the touch sensitive screen 3 of the portable device 1. The accessories (such as accessories 51-58) can be used for different functionalities, for interaction with the portable computer device 1 of FIG. 1 (e.g., in conjunction with a specific software application running on device 1), while other accessories (such as accessory 58) can be used as visual or audible indicators (e.g., LED, speaker and the like).

According to some embodiments of the present invention, the casing device 10 serves as an activity center in which at least part of the accessories embedded in the outer part of the casing may interact with an application through the data I/O port 5 of the portable computer device 1 of FIG. 1, e.g., using the electronic components 21-23 and via the physical I/O port connector 24, such as described with respect to FIG. 4.

The accessories may include one or more contact elements and/or a plurality of tactile elements, so as to enable to transfer to the corresponding application of device 1 variety of functionalities, such as linear and/or circular motions. For example, the element may include a mechanism in form of a rotational motion, such as a rotatable cylindrical body (e.g., accessory 53), a steering wheel (including enhanced functions, such as a horn, signaling, etc.), mechanism in a pedal-like and a gearstick-like form, an electronic card reader, sound effecting elements, elements in form of musical instruments (e.g., a piano or xylophone), a joystick and the like. According to an embodiment of the invention, each element is electronically connected to a computer based module embedded within the casing 10. For example, computer based module may communicate with the portable computer device 1 in a wired manner via the I/O port 5 of device 1 or wirelessly via any applicable wireless protocol such as Bluetooth, WiFi and the like.

According to an embodiment of the present invention, casing 10 comprises connecting means for allowing the attaching of add-on accessories (e.g., external or additional accessories such as boards, keypads, keyboards, joystick, card reader, etc). Alternatively, the connecting means allows the detaching and replacement of one or more accessories with other accessories. Such connecting means allows the user to customize the appearance and functionality of the casing 10. The connecting means allows connecting each add-on accessory to the casing 10 either electronically, mechanically or by a combination thereof.

As discussed above, the interactive casing device 10 provides a number of functions. The electronic accessories provide interactive experience to the user while the multiple, varied colors and patterns provide visual stimulation for children, and make the casing device 10 generally uniquely attractive. Additionally, since the casing device 10 has different textures, different tactile sensations are conferred to the user when the cover is touched. Furthermore, because of the nature of the designed element, children are able to rub and/or grab them in their hands and between their fingers. This provides a further, different range of tactual sensation, since rubbing the designed elements between the fingers creates a different sensation than just rubbing or stroking the fabric of the tags by itself. The designed elements also help children develop basic motor skills, since babies and young children are usually enjoy to touch with their fingers such designed elements.

Figure 9:
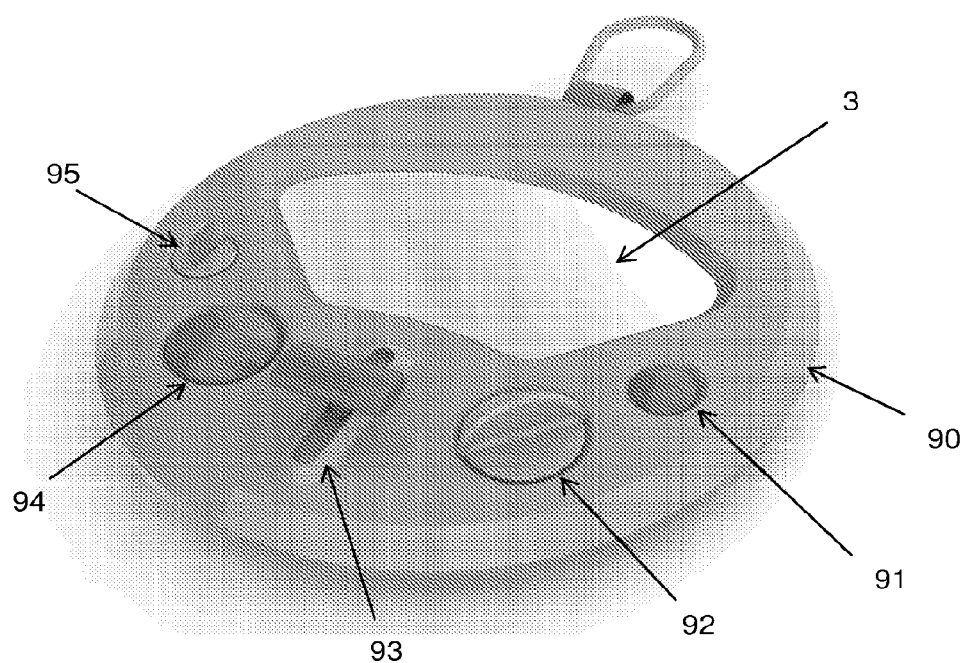
FIG. 9 schematically illustrates an exemplary casing device, according to an embodiment of the invention.

The casing device 10 according to the present invention is preferably manufactured in different sizes and shapes in order to fit different types of devices having touch sensitive screen. The casing device 10 can be stuffed with any type of padding. As should be appreciated, the casing device 10 will necessarily be larger (e.g., twelve inches by twenty-two inches in the case of a ten inch by twenty inch tablet PC) than the finished dimensions of the cover, to accommodate the padding. FIG. 9 schematically illustrates, in a perspective view, an exemplary casing device 90 in accordance with an embodiment of the present invention. The casing device 90 includes several accessories as indicated by numerals 91-95 and it partially covers the display 3 of a portable computer device.

Except as set forth above, the patterns, colors and textures of the ribbon or material for the protective cover may be of any type as desired, although preferably they are chosen for their potential attractiveness or interest to children in accordance to content of a given application or software. Therefore, a variety of bright colors (blues, greens, yellows, reds, oranges, etc.), textures (silky, satiny, coarse, ridged (corduroy), etc.) and patterns (alternating lines, stripes, paisleys, polka-dots, etc.) are appropriate, keeping in mind that the casing device 10 functions as an interactive activity center and therefore it should remain sturdy and functional.

According to an embodiment of the present invention, the casing 10 further comprises fixing means which can be used to fix or fasten the portable device 1 in a desired location or position, thereby better protecting the device 1 and allowing a safe and comfortable playing ground for the child. For example, the fixing means can be one or more suction cups attached to the rear panel of the casing device 10 (as indicated by numeral 59 in FIG. 6B) for fixing it on a flat surface, such as a table top, a floor, etc. Alternatively, the fixing means can be one or more Velcro straps attached to rear and/or side panel(s) of the casing device 10, in order to fastening it to the headrest or to the back of a car's front seat.

According to some embodiments of the present invention, the casing device 10 may further comprises additional features or accessories such as a carrying handle 18 as shown with respect to the various views of the casing device 10 in FIGS. 6A-6C and FIG. 7. The casing device 10 may further comprises a full casing (e.g., a padded casing) for protecting the touch sensitive screen while the device is not in use (not shown).

Figure 8:
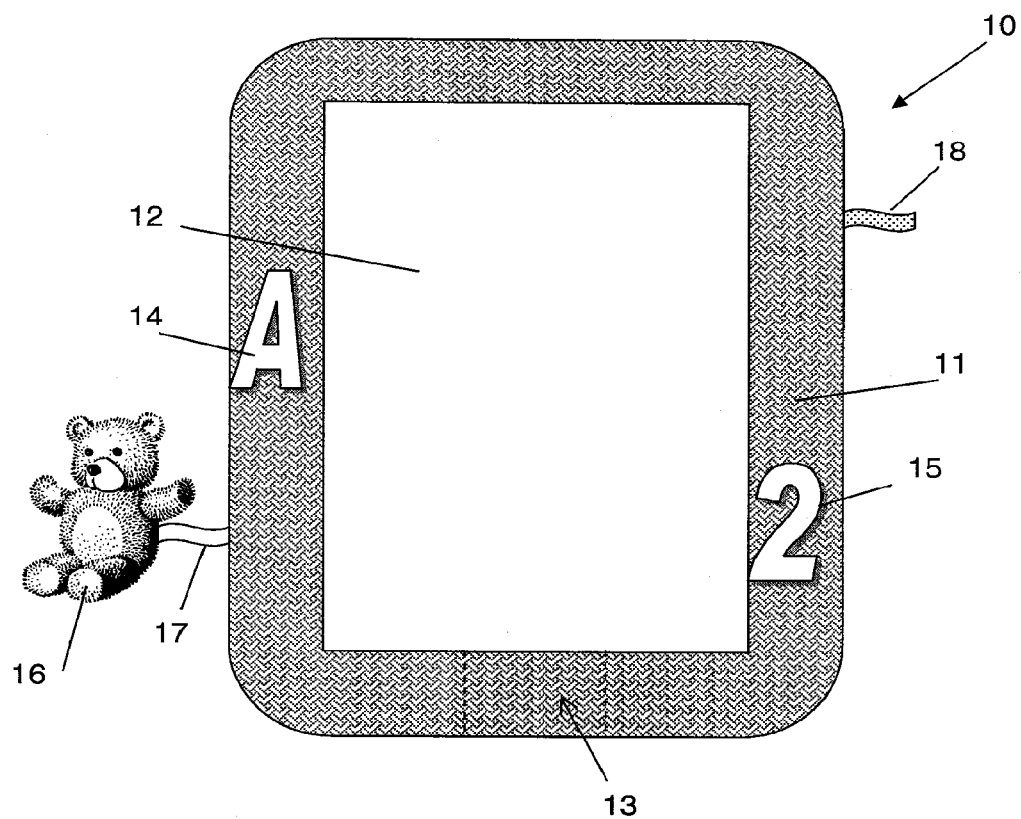
FIG. 8 schematically illustrates the multi-purpose casing provided with different patterns, textures, and colors, so as to provide visual and tactile stimulation for a user, according to an embodiment of the present invention.

According to some embodiments, the casing device 10 further comprises different patterns, textures, and colors, so as to provide visual and tactile stimulation for children. Turning now to FIG. 8, example of children oriented activity center for portable device, according to embodiments of the present invention, will now be given. In this embodiment, the casing device 10 (or at least part of the outer surface of it) comprises sheets of fabric attached together about their peripheries (e.g., via stitching). The sheets have different patterns, textures, and colors, so as to provide visual and tactile stimulation for children.

According to an embodiment of the present invention, one or more designed elements (e.g., alphabetical characters, ribbon loops, animals' forms, etc.) are disposed between and extend out from the edges and/or surface of the sheets and are attached thereto (e.g., by virtue of the stitching as indicated by numerals 14-18). Each of the elements 14-18 may also have different patterns, textures, and colors, so as to also provide visual and tactile stimulation for children. Additionally, the elements 14-18 may protrude from the edges/surface of the surface of the activity center 10 entice toddlers to practice fine motor skills.

For example, the surface (i.e., fabric sheets) of activity center 10 can be polyester fleece, which, besides being sturdy and machine washable, provides a very soft and welcoming texture. Part of the cover's surface may be provided with a pattern, as indicated in FIG. 8, while the other part may be provided in a solid, complementary color. Alternatively, other types of fabrics may be used, and may be patterned or solid, as desired.

As shown in FIG. 8, the frame-like structure 11 may comprise lengths of ribbon 17 (e.g., single face or grosgrain) or fabric whose ends are attached between the peripheral edges of the frame's surface, thereby forming a plurality of designed elements that extend out past the common edge of the surface, as shown with respect to the teddy bear 16. In this embodiment, the textures of the casing device 10 functions as means for providing sensory stimulation for children via the children's passive (ocular) or active (tactile, auditory, etc.) interaction with the portable computer device 1. For example, the designed elements 14-18 may protrude about 1-2 cm past the edge of the cover's surface. Although other dimensions are possible, this range of lengths provides a good balance between accessibility and safety. More specifically, the texture and the attached designed elements should be form in such a manner that they will optimally manipulated by children who should be able to rub the texture of the casing device 10 and its designed elements.

In such embodiments, the casing device 10 can be provided in a number of different colors, patterns, and textures. Thus, for example, the ribbon 17 might have a first color (or combination of colors) with a first pattern and a first texture, another ribbon 18 might have a second color (or combination of colors) with a second pattern. Moreover, according to an embodiment of the present invention, each designed element on the casing device 10 (or each covers or set of covers) can be designed with respect to the content of corresponding application running on the portable computer device 1 (e.g., an educative application for learning English letters or first words will be provided with a corresponding protective cover with designed elements of English letter attached to it), as this provides the most variety and developmental impetus. However, as should be appreciated, the texture and designed elements do not each have to have a unique combination of color, texture, and pattern, and, if desired, multiple iterations of the same texture or designs may be provided on the same cover. The designed element can be made of polyester for durability and wash-ability, although any type of fabric or material can be used.

Figure 10A:
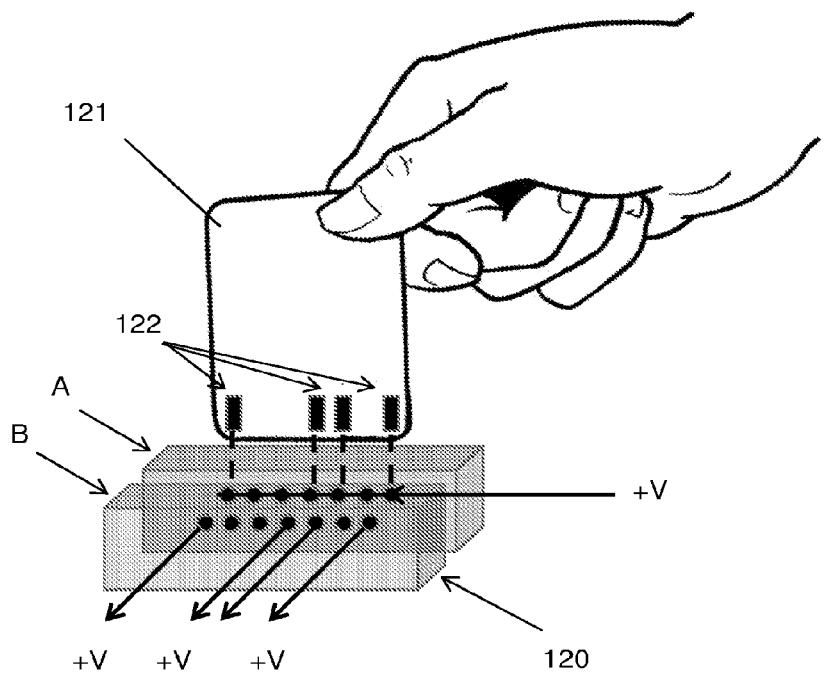
FIGS. 10A-10B schematically illustrate a card reader that can be added to the casing device of the invention either internally or externally.
Figure 10B:
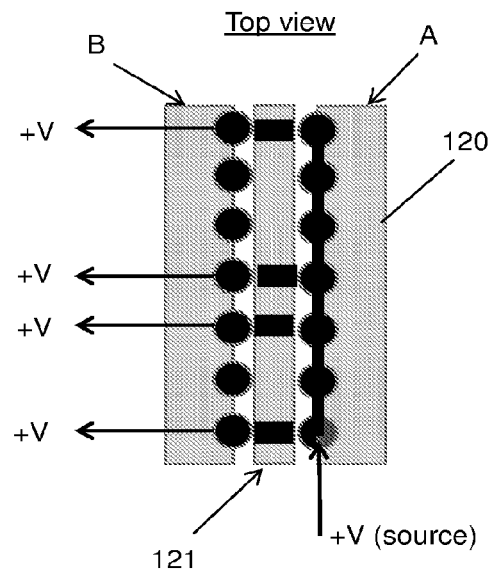

Referring now to FIGS. 10A-10B, according to an embodiment of the present invention, the casing device 10 comprises an accessory in form of a card reader 120. The card reader 120 is adapted to transfer electrical signals in a specific combination with accordance to the printed combination in the card as indicated by numeral 122. For example, a card 121 with a set of conductive contacts 122 in a certain combination can transfer selected electrical signal from side A to side B of the reader 120 such that the reader 120 will inject the electrical signal from one side of the card 121 and detect the set of signals that are transferred through the card contacts 122 on the other side as indicated by the signs "+V" as can be easily seen by the top view of the card reader 120 in FIG. 10B. The conductive contacts 122 in the card 121 transfer electrical signals from side A to side B of the reader 120 by realizing a certain combination/code. This code is further transferred to device 1 by one of the aforementioned electronic components in interact of a dedicated application in it.

Figure 11:
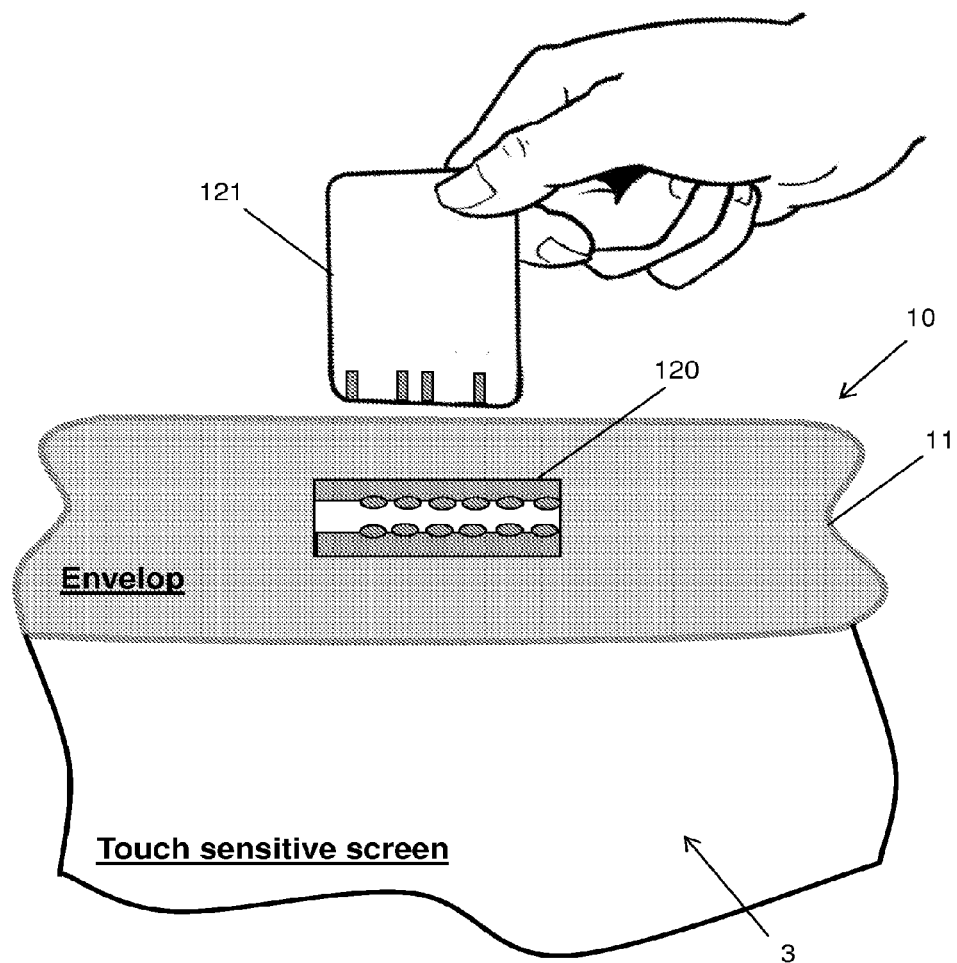
FIG. 11 schematically illustrates the card reader of FIGS. 10A and 10B embedded within the casing device, according to an embodiment of the invention.
Figure 12:
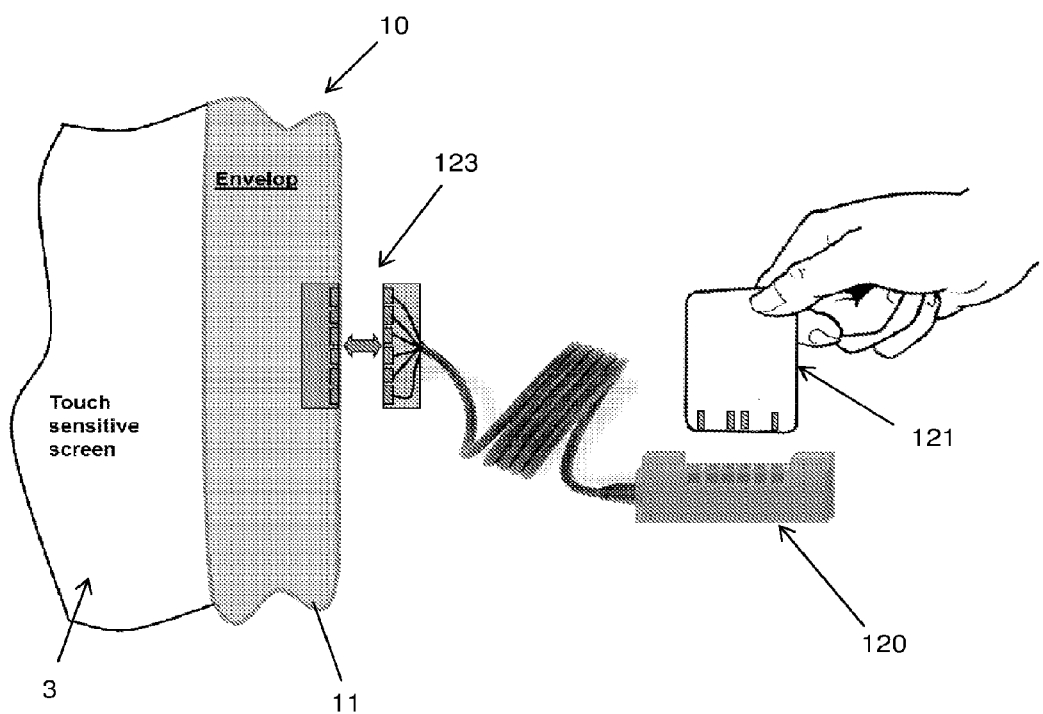
FIG. 12 schematically illustrates the card reader of FIGS. 10A and 10B connected to the casing device via a connection port, according to an embodiment of the invention.

FIG. 11 schematically illustrates the card reader 120 embedded in the casing device 10, according to an embodiment of the invention. FIG. 12 schematically illustrates the card reader 120 connected to the casing device 10 via an electric connection port and corresponding connector as indicated by numeral 123, according to another embodiment of the invention. Both FIGS. 11 and 12 shows a portion of the frame like structure 11 of the casing device 10 and a portion of the touch sensitive screen 3 of a portable computer device.

According to an embodiment of this invention, the casing device 10 further comprises connecting means for allowing attaching one or more additional accessories to its body. For example, such connecting means can be implemented by common techniques such as hook-and-loop fasteners (e.g., Velcro) or by any other suitable fasteners or attaching techniques as are known to a person skilled in the art.

Since the casing device of the present invention designed to be used also (and not only) by children, child- and fire-proofing features are paramount. Every attempt should be made to ensure that the casing device is safe for children to enjoy.

Although the casing device has been illustrated as being made from particular fabrics or materials, one of ordinary skill in the art will appreciate that certain changes could be made without departing from the spirit and scope of the invention. For example, other materials or fabrics could be used, and non-rectangular tablet shapes (e.g., circular, oblong, triangular, pentagonal, hexagonal) could be used.

Additionally, although the designed elements and the accessories have been illustrated as being attached to the periphery of the cover, they could also be attached to other area of the cover, without departing from the spirit and scope of the invention.

Also, although the protective cover body of the present invention has been illustrated as comprising fabric, one of ordinary skill in the art will appreciate that the cover body could be more "complex" structures comprising various types of fabric sewn together, or by other rigid materials such as Silicon or plastic without departing from the spirit and scope of the invention.

Since certain changes (including those listed above) may be made in the above described interactive protective cover for tablet PC, without departing from the spirit and scope of the invention herein involved, it is intended that all of the subject matter of the above description or shown in the accompanying drawings shall be interpreted merely as examples illustrating the inventive concept herein and shall not be construed as limiting the invention.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An activity center for a child, wherein said activity center is capable of running a dedicated application, and wherein said activity center comprises:
   a touch sensitive screen, capable of displaying visual indications, for allowing visual stimulation for said child;
   a memory module;
   a processing unit, electronically connected to said touch sensitive screen and said memory module, capable of interacting with said dedicated application, running on said activity center, for creating visual indications on said touch sensitive screen of said activity center;
   one or more tactile elements, having motion functionalities, for practicing and developing fine motor skills,
   each of said tactile element having a certain pattern, texture and color, for providing a tactile and visual stimulation for said child,
   said tactile element is electronically connected to said processing unit, for communicating with said processing unit,
   a motion of said tactile element, is communicated to said processing unit for creating said visual indications on said touch screen, of said activity center running said application,
   wherein the visual indication provides a visual stimulation for said child;

connecting means for allowing the attaching and detaching of add-on accessories to said activity center either electronically, mechanically or by any combination thereof; and at least one add-on accessory, which can be attached and detached to said activity center using said connecting means, for allowing a child interaction with said application, running on said activity center where said add-on accessory is provided with one or more predefined apertures for providing predefined access to said touch sensitive screen of said activity center.

2. An activity center according to claim 1, further comprising one or more audible elements for generating sounds.

3. An activity center according to claim 1, further comprising a transparent shield for protecting the screen of the touch sensitive screen of said activity center.

4. An activity center according to claim 1, further comprising different patterns, textures, and colors, for providing visual and tactile stimulation for the child.

5. An activity center according to claim 1, further comprising anchoring means attached to the rear surface and/or side(s) of said activity center for fixing said activity center in a desired location or position.

6. An activity center according to claim 5, in which the anchoring means are one or more suction cups attached to the rear surface of said activity center, for fixing said activity center to a flat surface.

7. An activity center according to claim 5, in which the anchoring means are one or more Velcro straps attached to the rear surface and/or side panel(s) of said activity center, for fastening said device to a car's seat.

* * * * *